(12) United States Patent
Kawagoe et al.

(10) Patent No.: US 6,325,717 B1
(45) Date of Patent: Dec. 4, 2001

(54) VIDEO GAME APPARATUS AND METHOD WITH ENHANCED VIRTUAL CAMERA CONTROL

(75) Inventors: Takumi Kawagoe; Yoichi Yamada; Hiroshi Umemiya; Masatoshi Ogawa, all of Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/441,468

(22) Filed: Nov. 17, 1999

Related U.S. Application Data
(60) Provisional application No. 60/123,728, filed on Mar. 10, 1999.

(30) Foreign Application Priority Data

Nov. 19, 1998 (JP) .................................................. 10-329807

(51) Int. Cl.[7] ............................ A63F 13/00; G06T 15/00
(52) U.S. Cl. ............................ 463/33; 345/427; 345/419
(58) Field of Search .................................. 463/31, 32, 33, 463/3, 4, 7; 345/427

(56) References Cited

U.S. PATENT DOCUMENTS 4,868,771 * 9/1989 Quick et al. .......................... 364/578
6,219,048 * 4/2001 Miller et al. .......................... 345/339

OTHER PUBLICATIONS

'Metal Gear Sold' Instruction Manual, Konami of America, Inc., 1998.*

'Azure Dreams' Instruction Manual, Konami of America, Inc., 1998.*

'Syphon Filter' Instruction Manual, Sony Computer Entertainment America, Inc., 1998.*

* cited by examiner

Primary Examiner—Michael O'Neill
Assistant Examiner—Steven Ashburn
(74) Attorney, Agent, or Firm—Nixon and Vanderhye P. C.

(57) ABSTRACT

A video game apparatus includes a CPU. The CPU detects a camera code of a land object at the foot of a player object. According to the camera code, a camera is selected from a first virtual camera, a second virtual camera, and so on up to a fifth virtual camera. The selected virtual camera is controlled according to the corresponding camera control program. The plurality of virtual cameras provided in a virtual three dimensional space are selected by the camera codes contained in the land objects.

16 Claims, 19 Drawing Sheets

VIDEO GAME APPARATUS AND METHOD WITH ENHANCED VIRTUAL CAMERA CONTROL

This appln claims benefit of Prov. No. 60/123,728 filed Mar. 10, 1999.

BACKGROUND OF THE INVENTION

1. Field of the Invention

This invention relates to a video game apparatus and a game program memory medium therefor, and more particularly to a video game apparatus which generates, and supplies to a display, an image signal to display a player object existing on a land object in a virtual three dimensional space by virtue of, say, player object data and land object data, and to a game program memory medium to be used therefor.

2. Description of the Prior Arts

In a conventional video game machine, when a player wishes a player object to, say, jump, the player presses a jump button on a controller so that the CPU causes the player object to jump in response to jump button operation. That is, when the player object is caused to jump over an obstacle, such as a hollow or hole, the player is required to press the jump button in timing of at a front of the hollow or hole while manipulating a move direction instructing means, such as a joystick or cross button. However, there may be a case that the player object be unsuccessful in jumping across the obstacle, as the timing may be of pressing the jump button, or the player object position, in operating the jump button. That is, skillful operation with a jump button has been required to make the player object jump up and get across an obstacle.

Meanwhile, complicated button operation has been needed to cause the player object to perform other actions than jump, (e.g. opening and closing a door or going up stairs, etc.). The player might be placed in difficulty to play a game with enjoyment of game progression because of his or her attention stuck to button manipulation.

Such games, called action games, are becoming more difficult to play year by year. They are too difficult for the player. In particular, there is a trend for beginners to sidestep from the games of such kind.

SUMMARY OF THE INVENTION

Therefore, it is a primary object of the present invention to provide a novel video game apparatus and a program memory medium to be used therefor.

It is another object of the present invention to provide a video game apparatus which can effect complicate camera control with a simple program, and a game program memory medium to be used therefor.

It is still another object of the present invention to provide a video game apparatus which can effect complicate camera switching over, and a game program memory medium to be used therefor.

A video game apparatus according to the present invention is a video game apparatus for generating, and supplying to a display, an image signal to display a player object existing on a land object in a virtual three dimensional space by processing image data for the player object and land object, the video game apparatus comprising: a player object image data generating means for generating player object image data to display a player object; a land object image data generating means for generating land object image data to display a land object, wherein the land object image data includes a camera code; a plurality of virtual cameras previously set up in order to shoot the player object existing in the virtual three dimensional space; a camera code detecting means for detecting the camera code in relation to a position of the player object; a camera selecting means for selecting one of the plurality of virtual cameras in accordance with the camera code; and an image signal generating means for generating an image signal due to shooting the player object by a virtual camera selected by the camera selecting means.

In a preferred embodiment, at least one of the plurality of virtual cameras is a movable camera which can follow a movement of the player object. In such a case, the image signal generating means includes a movable camera control means to control the movable camera.

Also, at least one of the plurality of virtual cameras is a zoom camera. In such a case, the image signal generating means includes a zoom camera control means to control the zoom camera. Incidentally, the land object includes a partition wall to partition a part of the virtual three dimensional space. In the case where the player object is allowed to move passing through the partition wall from one to another side of the partition wall, the zoom camera is provided on the other side of the partition wall. The zoom camera control means controls the zoom camera such that the zoom camera shoots in different forms the player object having moved to the other side. Specifically, the zoom camera is controlled such that the zoom camera shoots over a comparatively wide range including the player object immediately after the player object have moved to the other side and thereafter shoots a comparatively narrow range including the player object.

Also, the video game apparatus generally uses a storage medium to previously store a game program or image data. A storage medium according to the present invention is a storage medium to be applied to a video game apparatus for generating, and supplying to a display, an image signal to display a player object existing on a land object in a virtual three dimensional space by processing image data for the player object and land object, and stored with a program to be processed by an information processing means included in the video game apparatus, the memory medium comprising: a player object image data generating program for generating player object image data to display a player object; a land object image data generating program for generating land object image data to display a land object, wherein the land object image data includes a camera code; a plurality of virtual cameras previously set up in order to shoot the player object existing in the virtual three dimensional space; a camera code detecting program for detecting the camera code in relation to a position of the player object; a camera selecting program for selecting one of the plurality of virtual cameras in accordance with the camera code; and an image signal generating program for generating an image signal due to shooting the player object by a virtual camera selected by the camera selecting program.

The game program storage medium is formed with an image data area so that player object data and land object data can be stored on the image data area. The player object data includes polygon data representative of shapes and animation data representative of action states. The land object data includes polygon data representative of shape and attribute data. This attribute data includes a camera code or program control code. The game storage medium further includes a program to process image data so that the video game apparatus cam put forward a game according to the image data and program taking account, as required, controller data given from a controller. On a display screen is, in turn, displayed a game image shot by the virtual camera that the player object exists on a land object in the virtual three dimensional space.

When the player object approaches a relevant land object or exists on the land object, the detecting means (or program) detects a program control code or camera code contained in the land object image data. Consequently, the camera selecting means (or program) selects a particular virtual camera designated by the camera code. The image signal generating means (or program) controls a selected virtual camera, thus generating an image signal.

According to the present invention, one of a plurality of virtual cameras can be selected in accordance with a program control code or camera code contained in land object image data. It is therefore possible to simplify a camera control program. Conversely speaking, complicate camera control can be effected by a simplified program.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
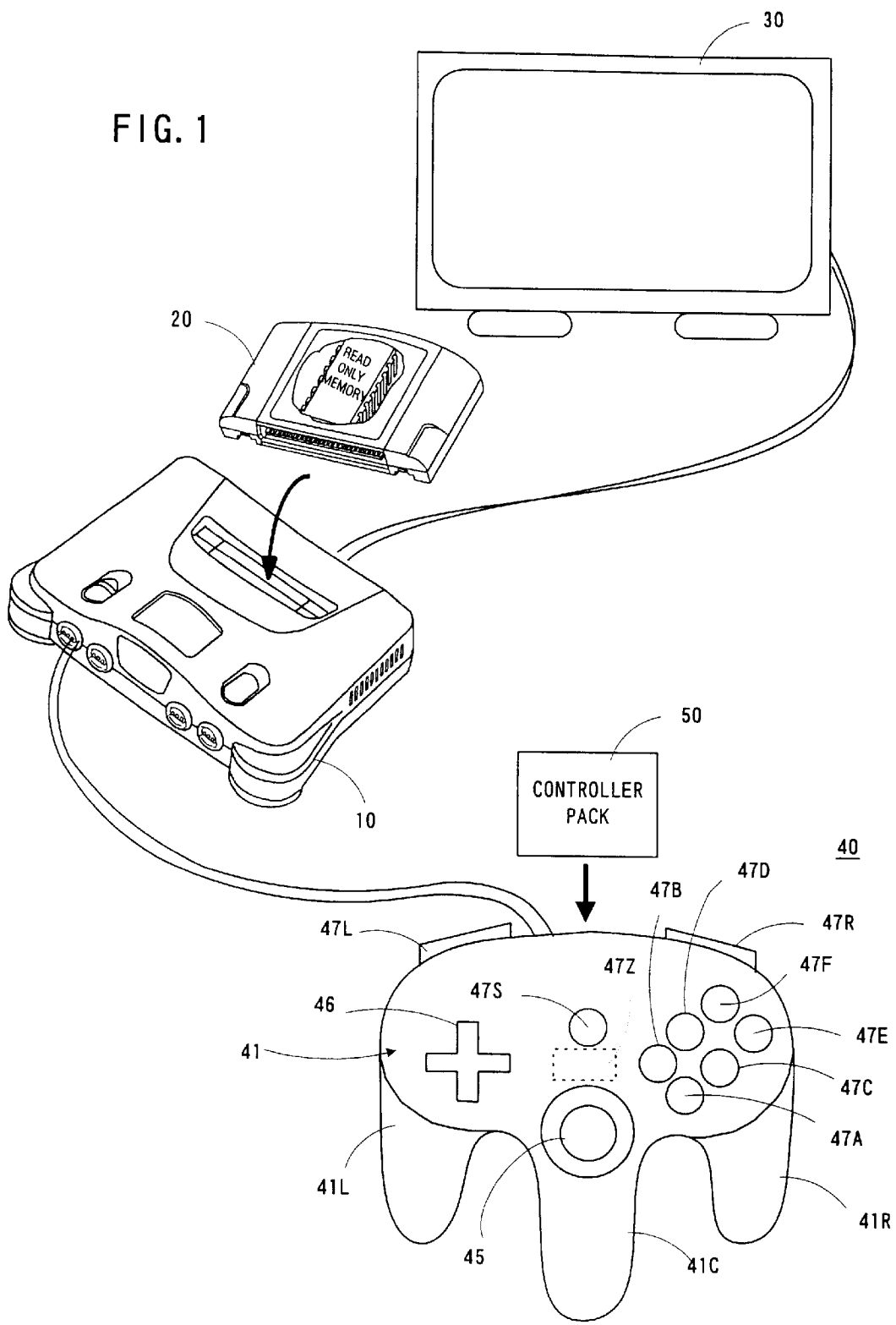
FIG. 1 is a schematic illustrative view showing a video game system of one embodiment of this invention.

Referring to FIG. 1, a video game apparatus in this embodiment includes a video game machine 10, a ROM cartridge 20 as one example of an information memory medium, a display unit 30 connected to the video game machine 10, and a controller 40. The controller 40 is dismountably mounted with a controller pack 50.

The controller 40 is structured by a plurality of switches or buttons provided on the housing 41 in a form graspable by both or one hand. Specifically, the controller 40 includes handles 41L, 41C, 41R downwardly extending respectively from a left end, a right end and a center of the housing 41, providing an operation area on a top surface of the housing 41. In the operation area, there are provided an analog-inputtable joystick (hereinafter referred to as "analog joystick") 45 at a central lower portion thereof, a cross-shaped digital direction switch (hereinafter called "cross switch") 46 on the left side, and a plurality of button switches 47A, 47B, 47D, 47E and 47F on the right side.

The analog joystick 45 is used to input a moving direction and/or moving speed or moving amount of the player object (object to be operated by a player through a controller) as determined by an amount and direction of joystick inclination. The cross switch 46 is used to designate a moving direction of the player object, in place of the joystick 45. The button switches 47A and 47B are used to designate a motion of the player object. Button switches 47C–47D are used to switch over a visual point of a three-dimension image camera or adjust speed or the like of the player object.

A start switch 47S is provided almost at a center of the operation area. This start switch 47S is operated when starting a game. A switch 47Z is provided at a backside of the central handle 41C. This switch 47Z is utilized, for example, as a trigger switch in a shoot game. Switches 47L and 47R are provided at upper left and right of a lateral surface of the housing 41.

Incidentally, the above-stated button switches 47C–47F can also be used to control the motion and/or moving speed (e.g. acceleration or deceleration) of the player object in a shoot or action game, besides for the purpose of switching the camera visual point. However, these switches 47A–47F, 47S, 47Z, 47L and 47R can be arbitrarily defined in their function depending upon a game program.

Figure 2:
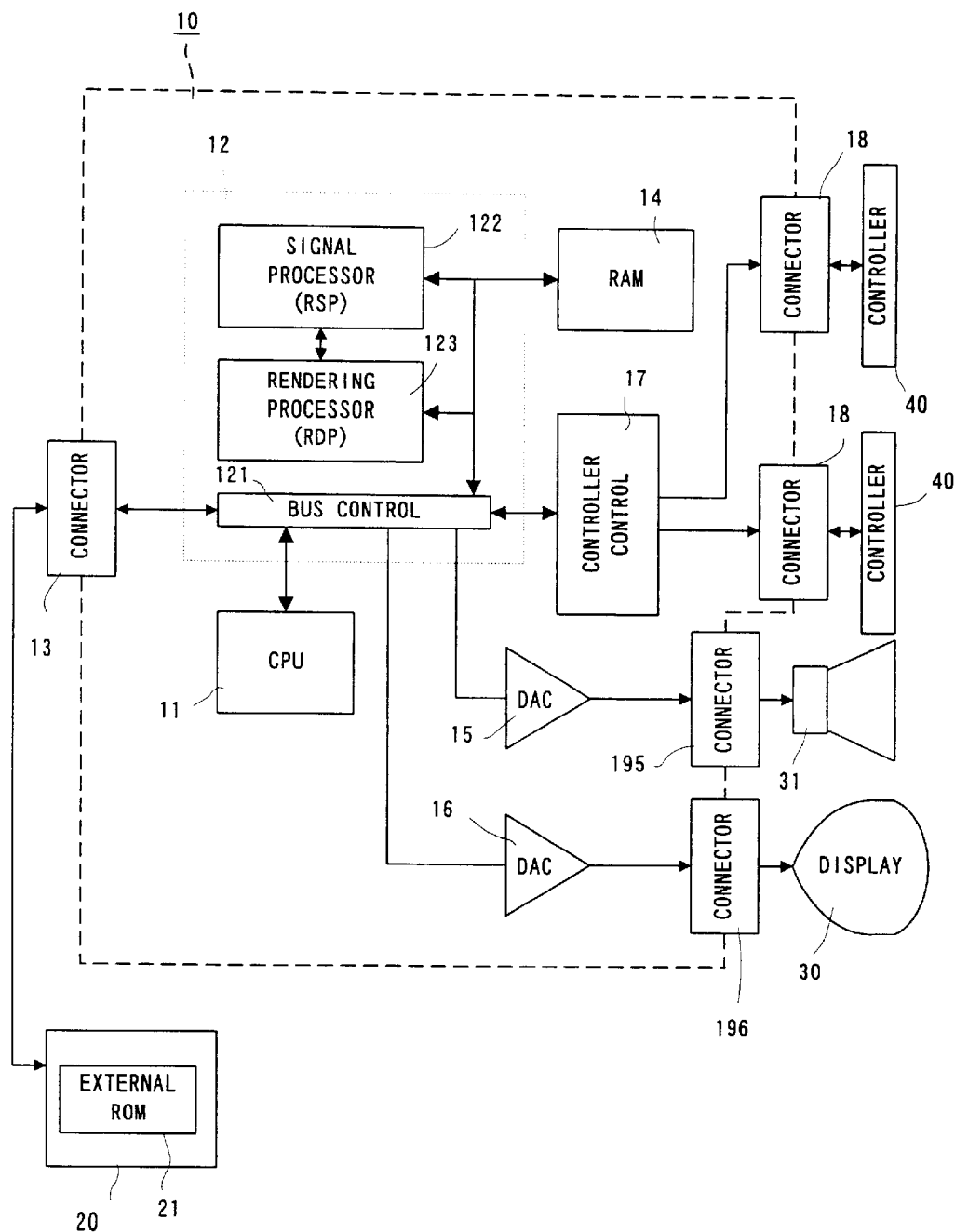
FIG. 2 is a block diagram showing in detail a video game machine of the FIG. 1 system.

FIG. 2 is a block diagram of the video game system of the FIG. 1 embodiment. The video game machine 10 incorporates therein a central processing unit (hereinafter referred to as "CPU") 11 and a coprocessor (reality coprocessor: hereinafter referred to as "RCP") 12. The RCP 12 includes a bus control circuit 121 for controlling buses, a signal processor (reality signal processor; hereinafter referred to as "RSP") 122 for performing polygon coordinate transformation, shading treatment and so on, and a rendering processor (reality display processor; hereinafter referred to as "RDP") 46 for rasterizing polygon data into an image to be displayed and converting the same into a data form (dot data) memorable on a frame memory.

The RCP 12 is connected with a cartridge connector 13 for unloadably loading a ROM cartridge 20 having an external ROM 21 incorporated therein, a disc-drive connector 197 for detachably mounting a disc drive 29, and a RAM 14. Also, the RCP 12 is connected with DAC (Digital/

Analog Converters) 15 and 16 for respectively outputting a sound signal and video signal to be processed by the CPU 11. Further, the RCP 12 is connected with a controller control circuit 17 to serially transfer operating data on one or a plurality of controllers 40 and/or controller pack 50.

The bus control circuit 121 included in the RCP 12 performs parallel/serial conversion on a command supplied in a parallel signal from the CPU via a bus, to thereby supply a serial signal to the controller control circuit 18. Also, the bus control circuit 121 converts a serial signal inputted from the controller control circuit 17 into a parallel signal, giving an output to the CPU 11 via the bus. The data representative of an operating state (operating signal or operating data) read out of the controller 40A–40D is processed by the CPU 11, and temporarily stored within a RAM 14, and so on. In other words, the RAM 15 includes a storage site for temporarily memorizing the data to be processed by the CPU 11, so that it is utilized for smoothly reading and writing data through the bus control circuit 121.

The sound DAC 15 is connected with a connector 19a provided at a rear face of the video game machine 10. The video DAC 16 is connected with a connector 19b provided at the rear face of the video game machine 10. The connector 19a is connected with a speaker 31 of a display 30, while the connector 19b is connected with a display 30 such as a TV receiver or CRT.

The controller control circuit 17 is connected with a controller connector provided at the front face of the video game machine 10. The connector 18 is disconnectably connected by a controller 40 through a connecting jack. The connection of the controller 40 to the connector 18 places the controller in electrical connection to the video game machine 10, thereby enabling transmission/reception or transfer of data between them.

Figure 3:
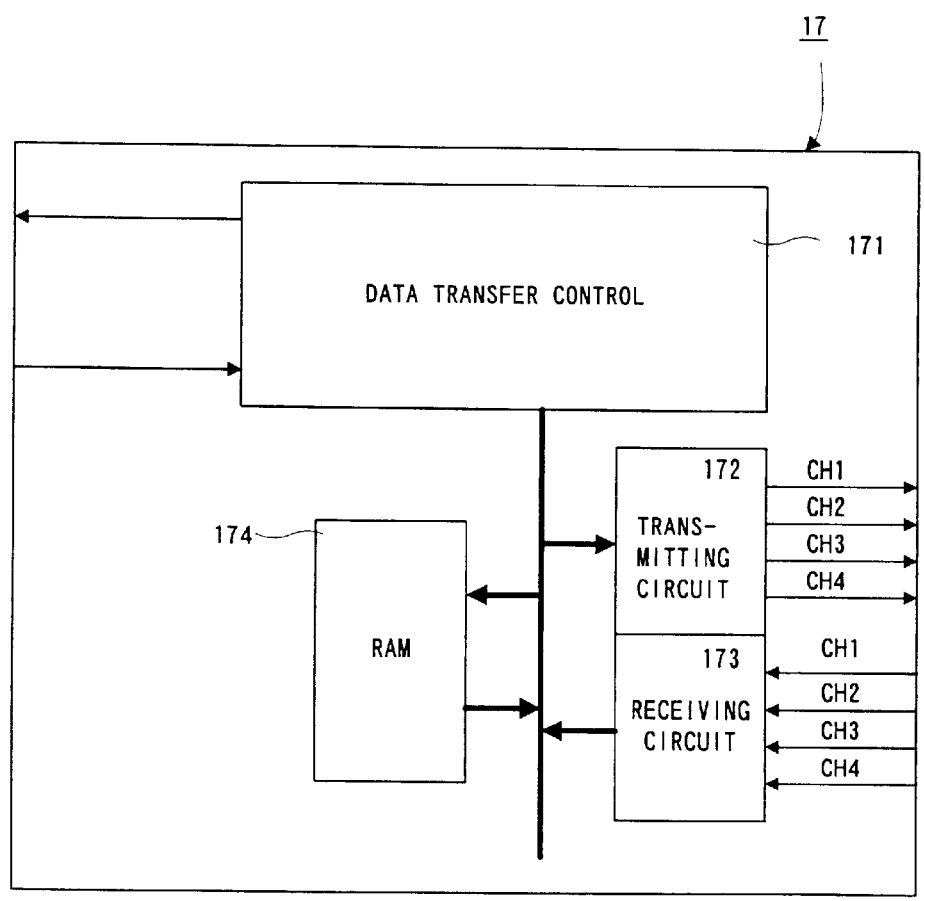
FIG. 3 is a block diagram showing in detail a controller control circuit of the FIG. 2 video game machine.

The controller control circuit 17 is used to transmit and receive data in serial between the RCP 12 and the connector 18. The controller control circuit 17 includes, as shown in FIG. 3, a data transfer control circuit 171, a transmitting circuit 172, a receiving circuit 173 and a RAM 174 for temporarily memorizing transmission and reception data. The data transfer control circuit 171 includes a parallel/serial converting circuit and a serial/parallel converting circuit in order to convert a data format during data transfer, and further performs write/read control on the RAM 174. The serial/parallel converting circuit converts the serial data supplied from the RCP 12 into parallel data, supplying it to the RAM 174 or the transmitting circuit 172. The parallel/serial converting circuit converts the parallel data supplied from the RAM 174 or the receiving circuit 173 into serial data, to supply it to the RCP 12. The transmitting circuit 172 converts the command for reading signals from the controller 40 and the writing data (parallel data) to the controller pack 50, into serial data to be delivered to channels CH1–CH4 corresponding to the respective controllers 40. The receiving circuit 173 receives, in serial data, operational state data of the controllers inputted through corresponding channels CH1–CH4 and data read from the controller pack 50, to convert them into parallel data to be delivered to the data transfer control circuit 171. The data transfer control circuit 171 writes into the RAM 174 data transferred from the RCP 12, data of the controller received by the receiving circuit 183, or data read out of the RAM controller pack 50, and reads data out of the RAM 174 based on a command from the RCP 12 so as to transfer it to the RCP 12.

The RAM 174, though not shown, includes memory sites for the respective channels CH1–CH4. Each of the memory sites is stored with a command for the channel, transmitting data and/or reception data.

Figure 4:
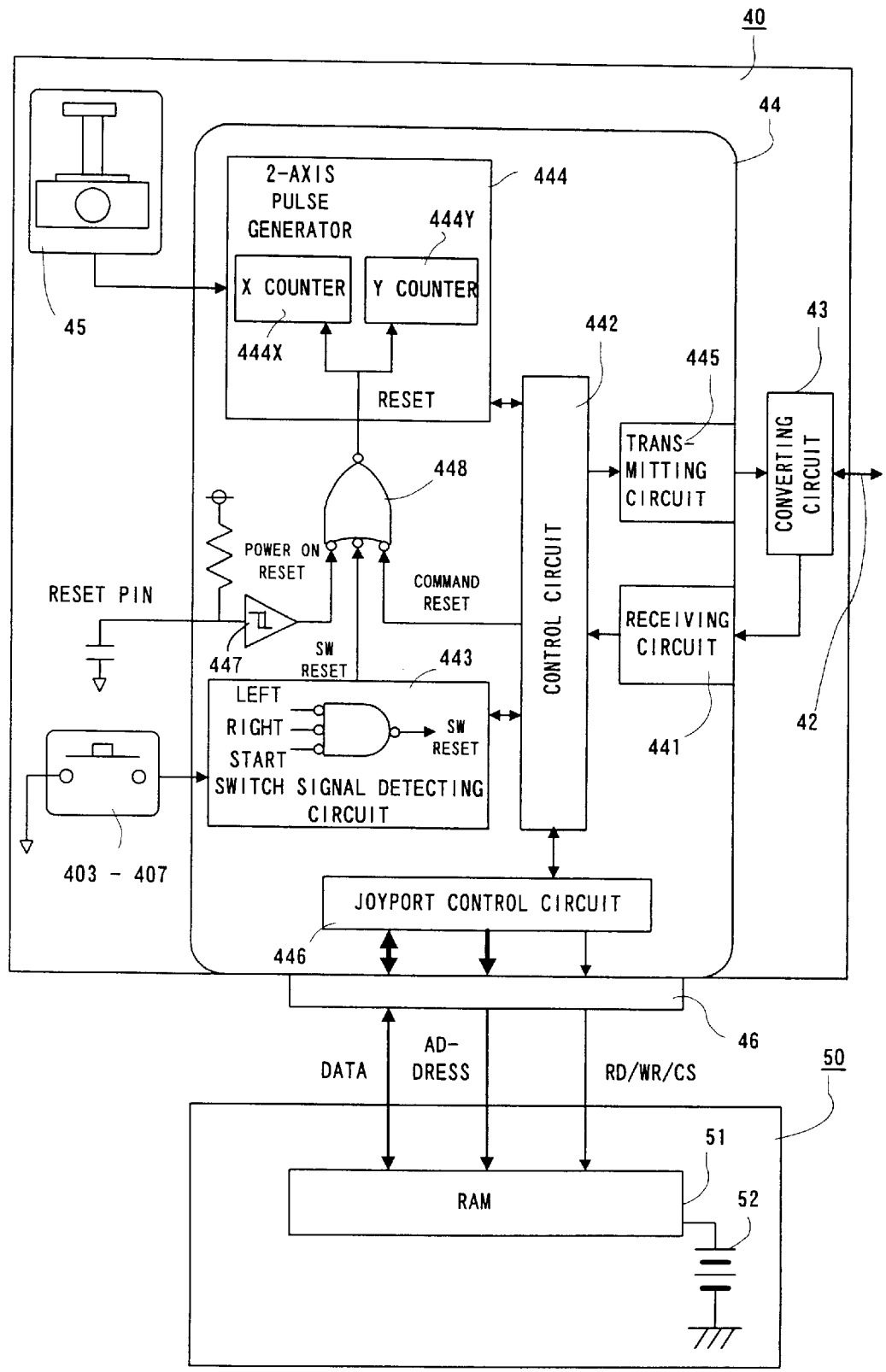
FIG. 4 is a block diagram showing in detail a controller and controller pack for the FIG. 2 video game machine.

FIG. 4 is a detailed circuit diagram of the controller 40 and the controller pack 50. The housing of the controller 40 incorporates an operating signal processing circuit 44, etc. in order to detect an operating state of the joystick 45, switches 46, 47, etc. and transfer the detected data to the controller control circuit 17. The operating signal processing circuit 44 includes a receiving circuit 441, a control circuit 442, a switch signal detecting circuit 443, a counter circuit 444, a joyport control circuit 446, a reset circuit 447 and a NOR gate 448. The receiving circuit 441 converts a serial signal, such as a control signal transmitted from the controller control circuit 17 or writing data to the controller pack 50, into a parallel signal to supply it to the control circuit 442. The control circuit 442 generates a reset signal to reset (0), through the NOR gate 448, count values of an X-axis counter 444X and a Y-axis counter 444Y within the counter 444, when the control signal transmitted from the controller control circuit 17 is a signal for resetting X, Y coordinates of the joystick 45.

The joystick 45 includes X-axis and Y-axis photo-interrupters in order to decompose a lever inclination into X-axis and Y-axis components, generating pulses in number proportional to the inclination. The pulse signals are respectively supplied to the counter 444X and the counter 444Y. The counter 444X counts a number of pulses generated in response to an inclination amount when the joystick 45 is inclined in the X-axis direction. The counter 444Y counts a number of pulses generated responsive to an inclination amount when the joystick 45 is inclined in the Y-axis direction. Accordingly, the resultant X-axis and Y-axis vector determined by the count values of the counters 444X and 444Y serves to determine a moving direction and a coordinate position of the player object or hero character or a cursor. Incidentally, the counter 444X and the 444Y are reset, when a reset signal is supplied from the reset signal generating circuit 447 upon turning on the power or a reset signal is supplied from the switch signal detecting circuit 443 by simultaneous depression of predetermined two switches.

The switch signal detecting circuit 443 responds to a switch-state output command supplied at an interval of a constant period (e.g. a 1/30 second interval as a TV frame period) from the control circuit 442, to read a signal varying depending upon a depression state of the cross switch 46 and the switches 47A–47Z. The read signal is delivered to the control circuit 442. The control circuit 442 responds to a read-out command signal of operational state data from the controller control circuit 17 to supply in a predetermined data format the operational state data on the switches 47A–47Z and count values of the counters 444X and 444Y to the transmitting circuit 445. The transmitting circuit 445 converts the parallel signal outputted from the control circuit 442 into a serial signal, and transfer it to the controller control circuit 17 via a converting circuit 43 and a signal line 42. The control circuit 442 is connected with a joystick control circuit 446 via an address bus and a data bus as well as a port connector 46. The joyport control circuit 446 performs data input/output (or transmission/reception) control according to a command from the CPU 11 when the controller pack 50 is connected to the port connector 46.

The controller pack 50 is structured by connecting the RAM 51 to the address bus and data bus and connecting the RAM 51 with a battery 52. The RAM 51 is to store backup data in relation to a game, and saves backup data by the application of electric power from the battery 52 even if the controller pack 50 is withdrawn from the port connector 46.

Figure 5:
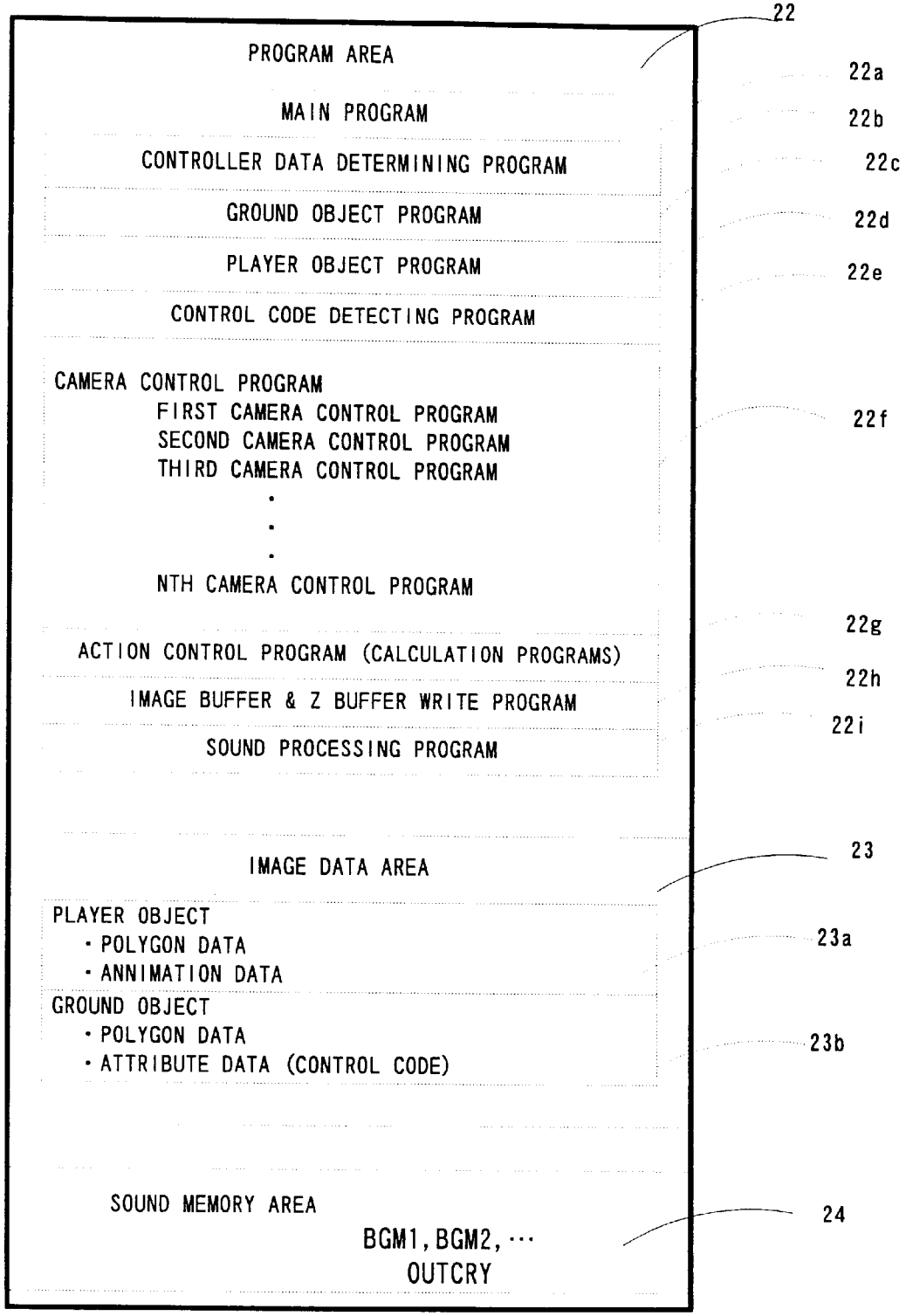
FIG. 5 is an illustrative view showing a memory map of an external ROM for the FIG. 2 video game machine.

FIG. 5 is a memory map illustrating a memory space of an external ROM 21 incorporated in the ROM cartridge 20 (FIG. 1, FIG. 2). The external ROM 21 includes a plurality of memory areas (may be hereinafter referred merely to as "areas"), i.e., a program area 22, an image data area 23 and a sound memory area 24, which are memorized previously and fixedly with various programs.

The program area 22 is memorized with a program required to process game images, game data suited for a game content, etc. Specifically, the program area 22 includes memory areas 22a–22i to previously, fixedly memorize a CPU 11 operation program. A main program area 22a is memorized with a main routine processing program for a game shown in FIG. 7, etc., hereinafter referred to. A controller data determining program area 22b is memorized with a program to process controller 40 operation data. A land object program area 22c is memorized with a program to display and control a land object on or in the vicinity of which the player object is to exist. A player object program area 22d is memorized with a program to display and control an object to be operated by a player (referred merely to as "player object").

The program area 22 further includes a control code detecting program area 22e. On this area 22e is installed a program to detect a control code contained in land object image data (hereinafter referred to). A camera control program area 22f is memorized with a camera control program to control in which direction and/or position a moving object, including the player object, or background object is to be taken in a three dimensional space. In the embodiment a plurality of virtual cameras are installed in a three dimensional space. Accordingly, the camera control program area 22f includes a first camera control program, second camera control program, . . . , Nth camera control program to individually control respective ones of first to Nth virtual cameras.

An action control program area 22g is memorized with a program to read out animation data contained in the player object image data, in order to cause the player object to act according to a control code detected by a control code detecting program. The action control program, concretely, includes various calculation programs. The calculation programs include a moving speed detecting program to detect a moving speed of the player object, a jump distance calculating program to calculate a jump distance of the player object based on a moving speed, and a wall height calculating program to calculate a wall height. This action control program determines an action for the player object according to an action code, control code or calculation program, and reads animation data out of the image data area 23 depending upon an action. Accordingly, the action control program 22g cooperates with the image data area 23 to thereby constitute an animation data output program.

An image buffer and Z buffer write program area 22h is memorized with a write program by which the CPU 11 causes the RCP 12 to effect writing onto an image buffer and a Z buffer. For example, the write program area 22h is memorized with a program to write color data to the frame memory area (FIG. 6) of the RAM and a program to write depth data to the Z buffer area 204 (FIG. 6), as image data based on texture data for a plurality of moving objects or background objects to be displayed on one background scene.

Incidentally, a sound process program area 22i is memorized with a program to generate a message through effect sound, melody or voices.

The image data area 23 includes, as shown in FIG. 5, two memory areas 23a and 23b. The memory area 23a is memorized with image data, such as coordinate data and animation data of a plurality of polygons, on an object-by-object basis, in order to display a player object, and with a display control program to display in a predetermined fixed position or movably an object. The memory area 23b is memorized with image data, such as a plurality of ones of polygon data and attribute data, on an object-by-object basis to display a land object, and with a display control program to display a land object. The attribute data includes an action code representative of an action to be performed by the player object (say, jump, wall scramble, door open and close, ladder climb, etc), a kind code representative of a kind of a land polygon (hole, ice, sand, lava, etc), a melody code representative of a kind of BGM, an enemy code representative whether an enemy is existing or not and an enemy kind, and a camera code to instruct switch between cameras. These codes are collectively referred to as "control codes". The control codes have been previously set within the polygon data of every polygon constituting the land objects to be set. Incidentally, the land objects required are considered to include a land object on which the player object is to exist, and a land object in the vicinity of which the player object is to exist, and so on.

A sound memory area 24 is memorized with sound data, such as phrases, effect sound and game melody, for each scene to output a message as above in a manner suited for a relevant scene. Specifically, BGM1 and BGM2 are memorized as a game melody, and sound data such as "outcry" as an effect sound.

Incidentally, the memory medium or external memory may use an arbitrary memory medium, such as a CD-ROM or magnetic disc, in place of or in addition to the ROM cartridge 20. In such a case, a disc drive (not shown) should be provided in order to read, or write as required, various ones of data for a game (including program data and image display data) from the optical or magnetic disc-formed memory medium, such as a CD-ROM or magnetic disc. This disc drive reads out data memorized on the magnetic disc or optical disc which is magnetically or optically memorized with similar program data to that of the external ROM 21, and transfers the data to the RAM 14.

In this manner, the program area 22 is installed with the programs so that a game image signal can be created by processing the image data set on the image data area 23 in a manner similar to the conventional video game apparatus, and a sound signal can be produced by processing the sound data installed on the sound memory area 24. In this embodiment, furthermore, a program control code is previously set on the image data memorized in the image data area 23, say, in the land object image data. When the program control code is detected in dependence upon a position of the player object, the animation for the player object is varied, the virtual camera is switched over and further the sound signal is changed in compliance with a detected program control code. Thus, the program control code serves as a program control factor or program change factor.

Due to this, if when a program code is detected the player object is changed in animation or the camera is switched over, it is possible to provide image change in a manner different from that by the execution of a usual program. Also, if when a program control code is detected the sound signal is switched over, it is possible to cause a different sound change from that by executing an ordinary program.

Incidentally, the control code is explained with greater detail. As mentioned above, the land object data includes attribute data, wherein the control code is included in the attribute data. The attribute data is a predetermined number of bits of data representative of what the present land object is, say, a kind of an object, such as a hole, floor, wall surface, stair, grassy land or the like. Therefore, the CPU 11 can determine a kind of a land object by detecting attribute data.

The control code is configured by 1 or 2 or more bits in attribute data. The attribute data is included within each polygon to constitute a land object. As a result, the control data is included in each polygon. The control code represents, by 1 or 2 or more bits, a control content, say, "jump", "climb", "enter door", "ladder", "camera switch", "sound switch", etc.

Incidentally, in the above explanation, a kind of a land object was determined by referring to attribute data. However, the method for detecting a land object may be as follows. For example, a land object on which the player object is moving may be detected as a floor object whereby a land object provided at 90 degrees (vertically) with respect to the floor object is detected as a wall or wall surface object. In this case, a land object existing at above the player object will be detected as a ceiling object. That is, a kind of a land object may be determined by a positional relationship, angle or the like relative to the player object.

In either case, a program control code (including a control code, action code, camera code, sound code, and so on) is set in attribute data.

Figure 6:
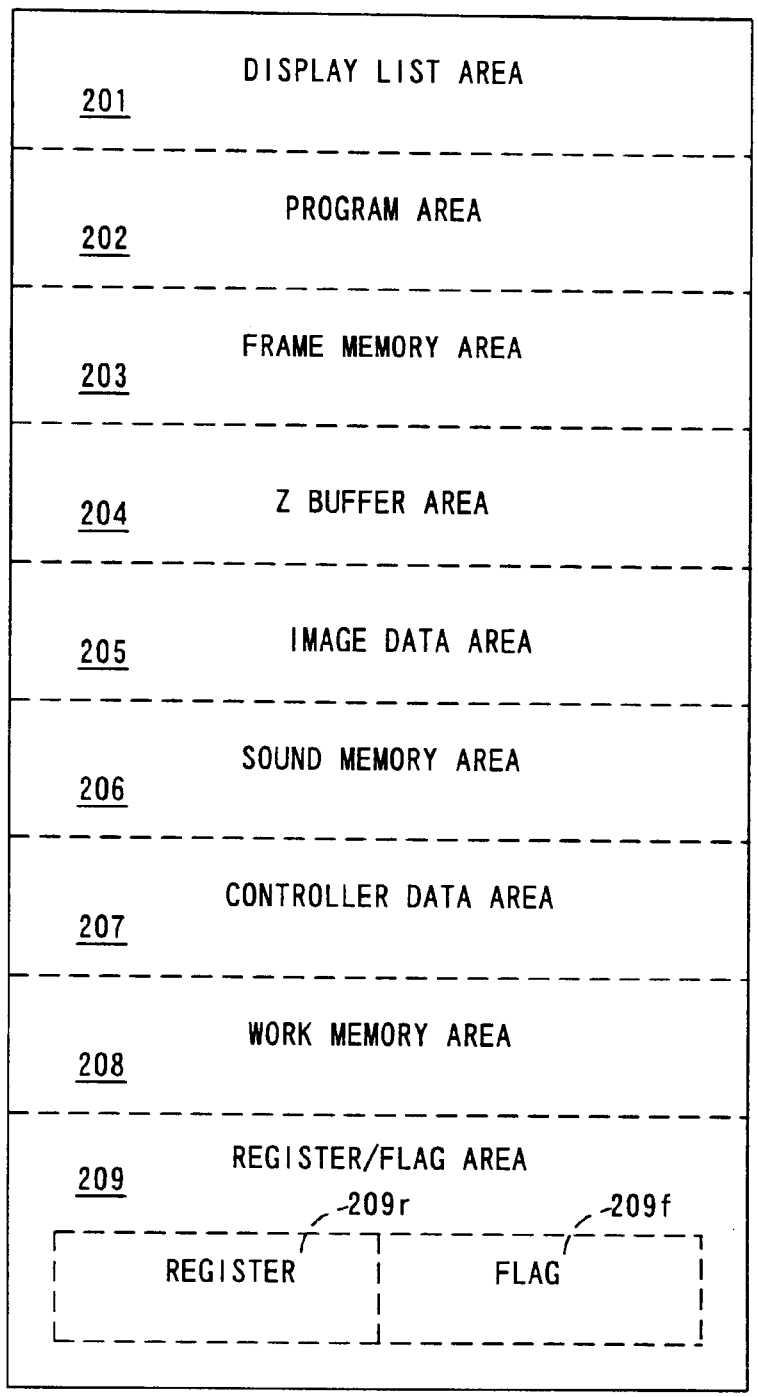
FIG. 6 is an illustrative view showing a memory map of a RAM for the FIG. 2 video game machine.

FIG. 6 is a memory map illustrating an entire memory space of the RAM 14. The RAM 14 includes various memory areas 201–209. For example, the RAM 14 includes a display list area 201, a program area 202, a frame memory (or image buffer memory) area 203 for temporarily memorizing 1 frame of image data, a Z buffer area 204 for memorizing, dot by dot, depth data of the frame memory area data, an image data area 205, a sound memory area 206, an area 207 for memorizing controller operation state data, a working memory area 208, and register/flag area 209. The memory areas 201–209 are memory spaces to be accessed through the bus control circuit 121 by the CPU 11 or directly by the RCP 12, and assigned with an arbitrary capacity (or memory space) by a game used. Meanwhile, the image data area 205 and the sound memory area 206 are to temporarily memorize image data or sound data required to execute a program transferred to the program area 202, which program is a part of data of game programs for 1 game entire scene (stage) memorized in the memory area 22 of the ROM 21, e.g. a game program required for 1 course or stage. In this manner, if the program required for a certain scene or data part are memorized in the memory areas 202, 205, 206, it is possible to enhance data processing efficiency and hence image processing speed as compared to the processing by directly reading from the ROM 21 each time the CPU requires.

Specifically, the frame memory area 203 has a memory capacity corresponding to the number of picture elements (pixels or dots) of the display 30 (FIG. 1)×the number of bits of color data per pixel, to memorize color data dot by dot corresponding to the pixels on the display 30. The frame memory area 203 temporarily memorizes color data dot by dot when displaying a moving object, such as a player object, fellow object, enemy object, boss object etc. or various other objects such as a land object, background (or stationary) object, etc. that are memorized in the image data area 105.

The Z buffer area 204 has a memory capacity corresponding to the number of picture elements (pixels or dots) of the display 30× the number of bits of depth data per pixel, to memorize depth data dot by dot corresponding to each pixel on the display 30. The Z buffer area 204 temporarily memorizes depth data dot by dot when displaying a moving and/or stationary object, i.e. a moving object such as a player object, fellow object, enemy object, boss object or the like, and various other objects such as a land object, background (or stationary) object or the like that are memorized in the image data area 205.

The image data area 205 is to memorize coordinate data and texture data for polygons to be constituted in a plurality of sets for each of stationary and/or movable objects for game display memorized in the ROM 21, to which 1 course or stage of data, for example, is transferred from the ROM 21 in advance of their image processing. Incidentally, this image data area 205 also memorizes animation data that has been read out, as required, from the image data area 23 of the external ROM 21.

The sound memory area 206 is transferred by part of the sound data (data of phrase, melody and effect sound) memorized in the memory area of the ROM 21, and temporarily memorize it as sound data to be produced through a sound producing unit 32.

The controller data (operation state data) memory area 207 temporarily memorizes operation state data representative of an operation state read from the controller 40.

The working memory area 208 temporarily memorizes data such as parameters during execution of a program by the CPU 11.

The register/flag area 209 includes register area 209r and flag area 209f. The register area 209r, though not shown, is formed with a plurality of registers to be individually loaded with data. The register area 209r, though not shown, is formed with a plurality of flags to be separately set or reset.

Figure 7:
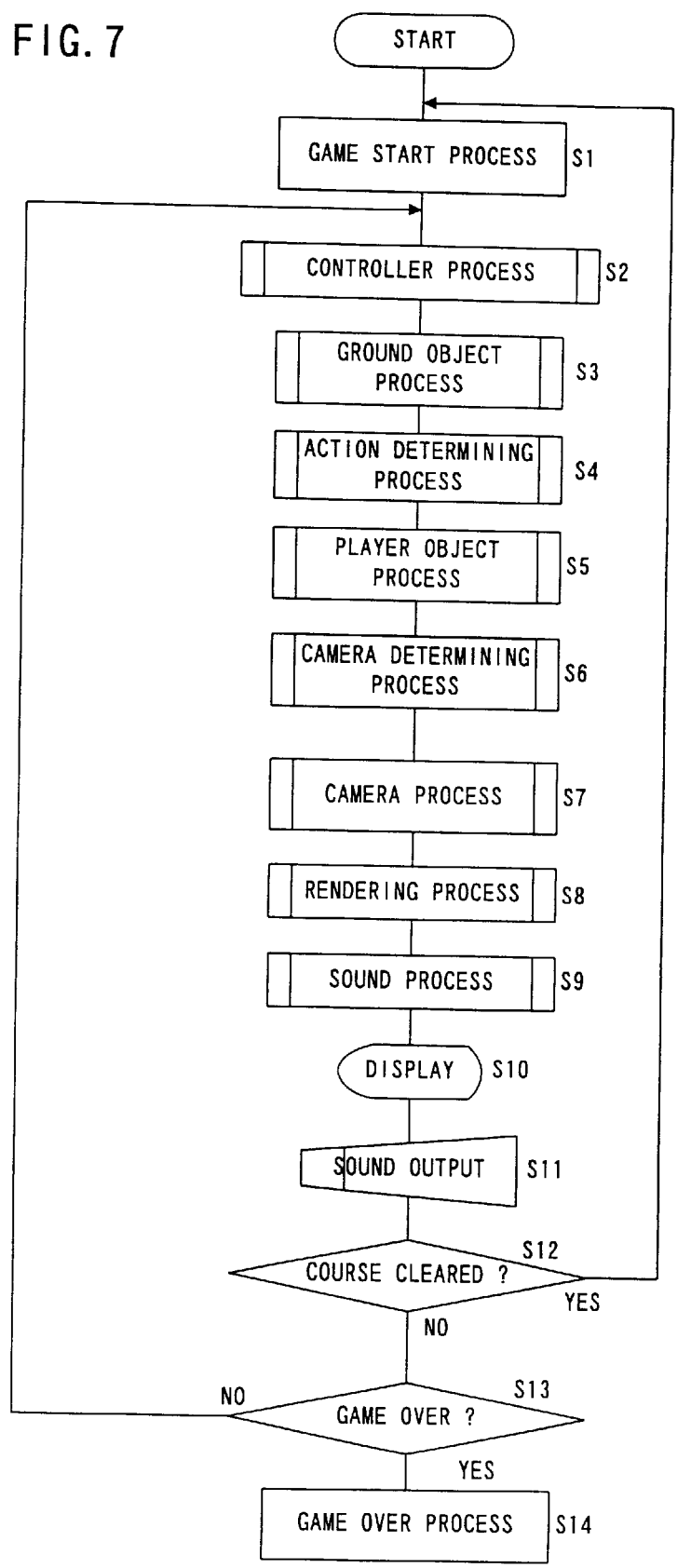
FIG. 7 is a flowchart showing an overall operation of the FIG. 1 embodiment.

FIG. 7 is a main flowchart of the video game system in this embodiment. If a power is turned on, in a first step S1, the CPU 11 at a start sets the video game machine 10 in a predetermined initial state. For example, the CPU 11 transfers a starting program of the game programs memorized on the program area 22 of the external ROM 21 to the program area 202 of the RAM 14, and sets parameters to their initial values, executing sequentially steps of FIG. 7.

The operation of the main flowchart of FIG. 7 is carried out, for example, at an interval of 1 frame (1/60th second) or 2 or 3 frames. The steps S2–S12 are repeatedly executed until the course has been cleared. If the game comes over without successfully clearing the course, in step S14 following step S13 a game over process is performed. If the course clear is successful, the process returns from the step S12 to the step S1.

That is, in the step S1 is displayed a game course screen and/or course selecting screen. However, if the game is started after turning on the power, a screen of first course is displayed. If the first course is cleared, a next course is set up.

In the step S2 following the step S1 is carried out a controller process. In this process, detection is made on which one was operated of the joystick 45 of the controller 40, cross switch 46 and switches 47A–47Z. The operation state detection data (controller data) is read in, and the controller data thus read is written onto the controller data area 141 of the RAM 14.

In the step S3 a land object process is performed. This process, though hereinafter explained in detail with reference to a subroutine of FIG. 8, includes a calculation of a land object display position and shape based on a program partly transferred from the memory area 22c and land object polygon data transferred from the memory area (FIG. 5).

In the step S4 a process is executed to determine an action for the player object. Concretely, determination is made on an action for the player object according to a control code or action code explained before.

In step S5 a process is performed to display a player object. This process is basically a process to cause changes in position, direction, shape and location on the basis of a joystick 45 operating state (controller data) operated by a player and the presence or absence of enemy attack. For example, the polygon data after change is determined by calculation based on the program transferred from the memory area 22e (FIG. 5) of the external ROM 21, the player object polygon data transferred from the memory area 23a, and the controller data, i.e. joystick 45 operating state. Colors are given by texture data to a plurality of polygons obtained by the above.

The step S6 is a step to carry out a camera determination process. In concrete, it is determined which virtual camera of a plurality of virtual cameras is to be used in taking pictures of an object in a virtual three dimensional space, according to a switch code (control code) contained in land object data explained before. This will be hereinafter explained in detail with reference to FIG. 27 to FIG. 36.

In the step S7 a camera process is carried out. For example, a coordinate of a visual point to the object is calculated such that a line or field of sight as viewed through a viewfinder of the virtual camera comes to an angle designated through the joystick 45 by the player.

In the step S8 the RSP 122 performs a rendering process. That is, the RCP 12 under the control of CPU 11 performs transformation (coordinate transformation and frame memory rendering) on the image data to display a movable object and stationary object based on the texture data for the movable object, such as an enemy object, player object, or the like, and the stationary object, such as for background, memorized in the image data area 201 of the RAM 14. Specifically, colors are given to a plurality of polygons for each of a plurality of movable objects and stationary objects.

In the step S9, the CPU 11 performs a sound process based on sound data, such as messages, melody, effect sound, etc. In particular, BGM and the like are switched over according to a melody code (control code) previously set in the land object.

In the next step S10 the CPU 11 reads out image data memorized on the frame memory area 203 of the RAM 14, according to a result of the rendering process of the step S7. Accordingly, a player object, moving object, stationary object and enemy object, and the like are displayed on a display screen of the display 30 (FIG. 1, FIG. 2).

In the step S11, the RCP 12 reads out the sound data obtained as a result of the sound processing of the step S18, thereby outputting sound such as melody, effect sound, conversation, etc.

In the step S12 whether the course was cleared or not is determined (course clear detection). If the course was not cleared, it is determined in the step S13 whether the game is over or not. If not game over, process returns to the step S2 to repeat the steps S2 –S13 until a condition of game over is detected. If a game over condition is detected, i.e. the number of mistakes permitted for the player reaches a predetermined number of times or the life of player object is consumed by a predetermined amount, then in the step S14 is effected a game over process, such as a selection of game play continuation or backup data memorization.

Incidentally, in the step S12 if a condition of clearing the course (e.g. defeating a boss, etc.) is detected, the course clear process is carried out and thereafter the process returns to the step S1.

Figure 8:
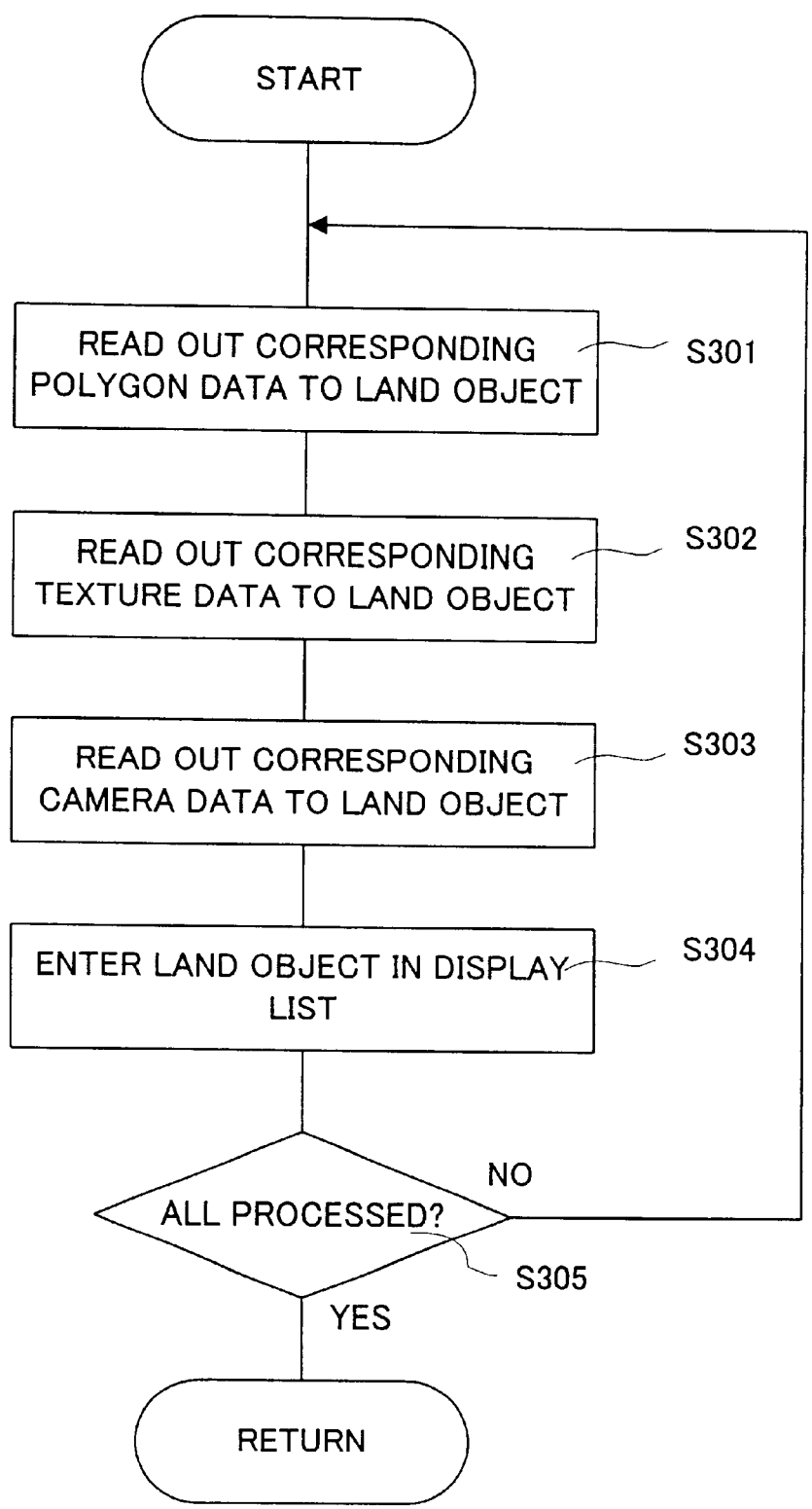
FIG. 8 is a flowchart showing in detail a land object process in the FIG. 7 flowchart.

FIG. 8 is a subroutine of the land object process shown in the step S3 of FIG. 7. In a first step 301, the CPU 11 (FIG. 2) reads out polygon data, or a land object required at that time, transferred from the image data area 23 (FIG. 5) of the external ROM 21 to the image data area 205 (FIG. 6) of the internal RAM 14. This polygon data has a control code previously set as required therein, as was explained before. Accordingly, if the step S301 is executed, the same control data is simultaneously read out. Incidentally, the read polygon data containing a control code (action code, camera switch code, sound code or the like) is temporarily held in a display list area 201 of the internal RAM 14.

In step S302 texture data is read out which corresponds to the land object and transferred to the image data area 205 of the internal RAM 14. In step S303 camera data is similarly read out of the image data area 205 which corresponds to that land object. These texture data and camera data are memorized on the display list area 201, similarly to the polygon data.

Then, in step S304 the land object is memorized in the display list area 201. It is determined in step S305 whether the process of from the step S301 to the step S304 has been executed on all the land objects or not. If the determination is "NO", the process is again executed from the step S301. If all the land objects has been completed of the process, i.e. if "YES" is determined, the subroutine of FIG. 8 is ended and the process returns to the main routine.

Figure 9:
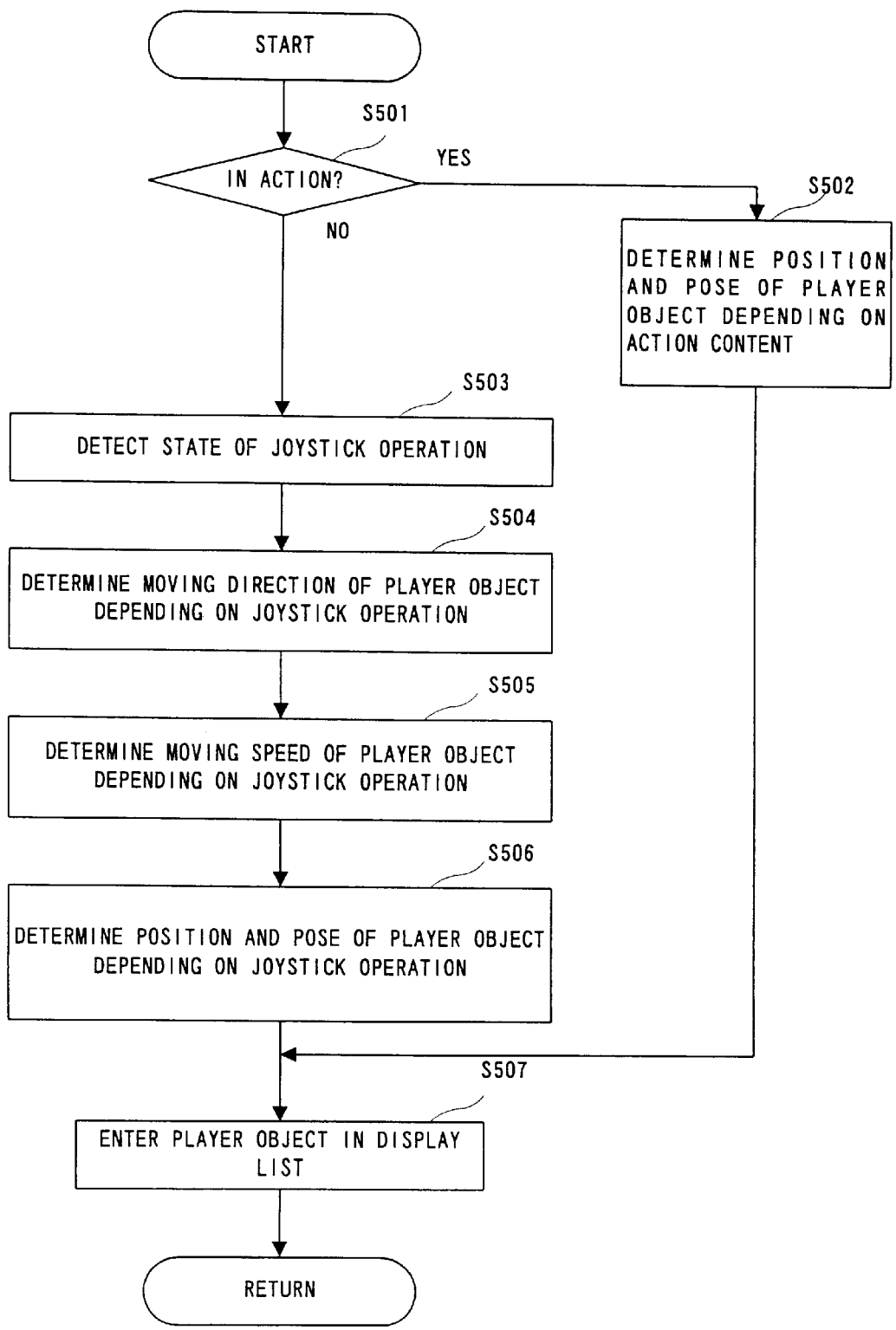
FIG. 9 is a flowchart showing in detail a player object process in the FIG. 7 flowchart.

Incidentally, a flowchart shown in FIG. 9 represents a player object processing operation for the step S5 of the main routine of FIG. 7. In the first step S501, the CPU 11 determines whether the player object is in a course of action or not. If in a course of action, a position and pose of the player object are determined so that the player object continues its action. The pose is determined by animation data as was explained before.

If the player object is not in a course of action, the CPU 11 in the following step S503 detects an operation state of the joystick 45 (FIG. 1, FIG. 4) included in the controller 40. Subsequently, a moving direction, moving speed and position and pose of the player object are determined respectively in steps S503, S504 and S505, according to an operation state of the joystick 45. In step S507, the player object is registered to the display list area 201 (FIG. 6) of the RAM 14, similarly to the case after passing through the step S502. In response, the player object is to be displayed depending upon the joystick 45 operation state.

The camera determination process in the step S6 of the FIG. 7 main routine is explained in detail with reference to FIG. 10 as well as the related figures. In the first step S601 of FIG. 10, the CPU 11 makes reference to the data in the image data area 205, and detects a control code (camera code) previously set in the object data of a land object existing underneath the player object. In each of steps S602, S604, S606, S608 and S610, it is determined whether the detected control code is a first camera code, second camera code, third camera code, fourth camera code or fifth camera code.

Figure 11:
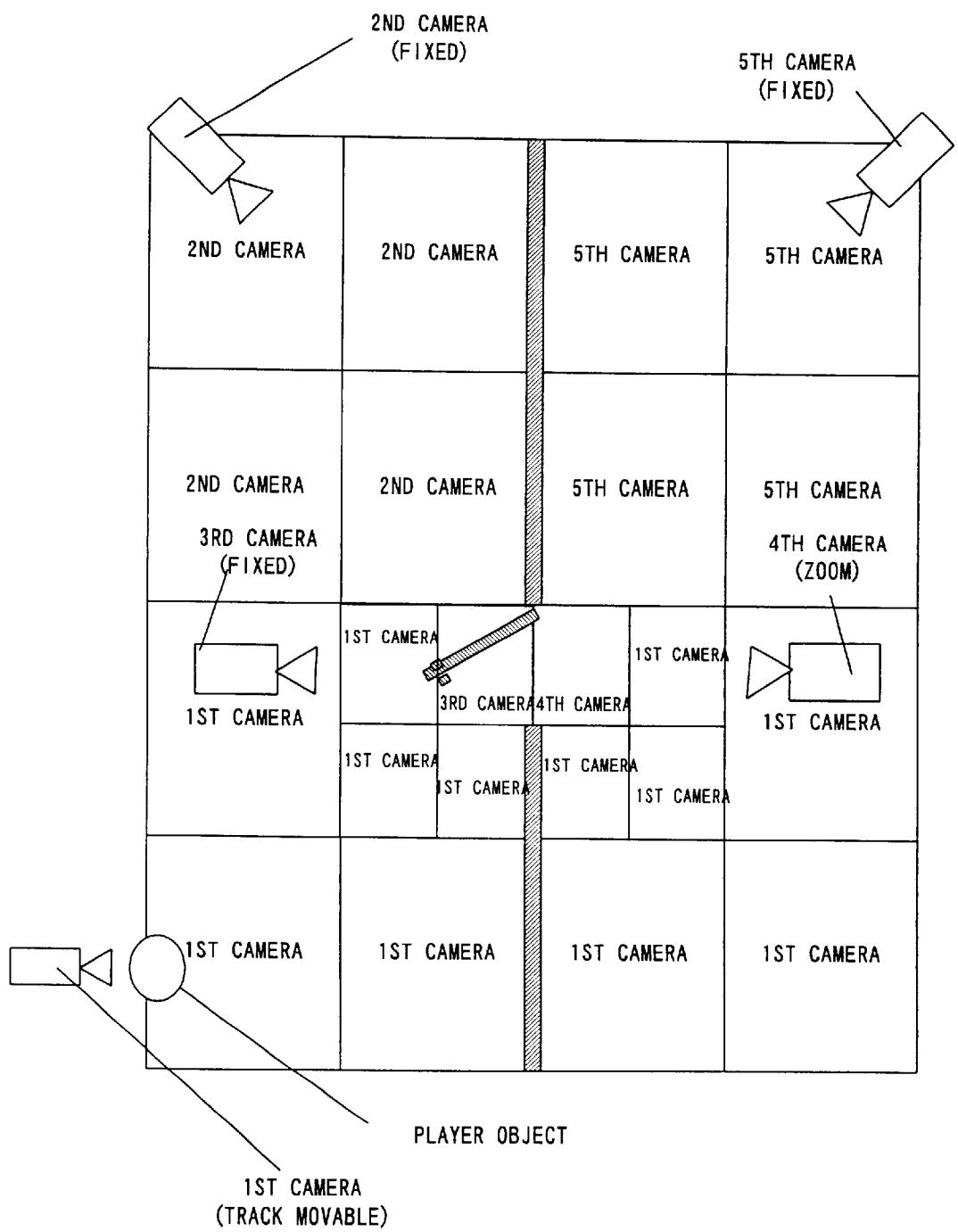
FIG. 11 is an illustrative view showing one example of camera arrangement as a premise for the camera determining process of FIG. 10 flowchart.

Explanation is made herein on a first camera, second camera, third camera, fourth camera, and fifth camera which have been placed in the virtual three dimensional space in the embodiment, based on FIG. 11. In an example of FIG. 11, a longitudinal wall is provided in almost a center of a space that is rectangular in plan, wherein a door is formed on one part of the wall. A third camera is fixedly set up on one side of the door (on side of door opening) which is directed to the door. On an opposite side to the door, a fourth camera is set up. This fourth camera is provided as a zoom camera to take a player object that is going to open and enter the door. Furthermore, a second camera and fifth camera are individually, fixedly set up at two respective corners in the space. The first camera is provided as a movable camera which is allowed to move following the player object. Camera control is explained below on an assumption of this embodiment having the five virtual cameras in the three dimensional space as above. However, it is needless to say that the number, arrangement and function or roll (fixing, moving, zooming, etc.) can be appropriately modified as required.

Note that in FIG. 11 the terms "first camera", "second camera", . . . , "fifth camera" given in blocks (rectangular lattices) respectively represent control codes, or camera codes, previously having been set in the land objects of this three dimensional space. Consequently, when the player object is existing in one block, the player object will be taken by a camera corresponding to a camera code having been set on that block.

Referring back to FIG. 10, if a first camera code is detected in step S602, then in the following step S603 a first camera control program is selectively set. The camera control program, as explained before, is set in the camera control program area 22f (FIG. 5) of the external ROM 21, which is transferred as required to the program area 202 of the internal RAM 14. Accordingly, the CPU 11 in step S603 reads a first camera control program out of the program area 202 (FIG. 6).

The first camera control program is a control program for the first camera, and the first camera is arranged to move following the player object as described before. In the first camera control program detailed in FIG. 12, in step S612 the data in the image data area 205 (FIG. 6) is first referred to detect a position of the player object. In the next step S613, the CPU 11 determines a position of the first camera such that the distance from the player object to the first camera becomes constant. In step S614 the first camera is directed of picture taking direction to the player object. Accordingly, the first camera is to take a player object-back view with a constant distance, as shown in FIG. 13.

Figure 12:
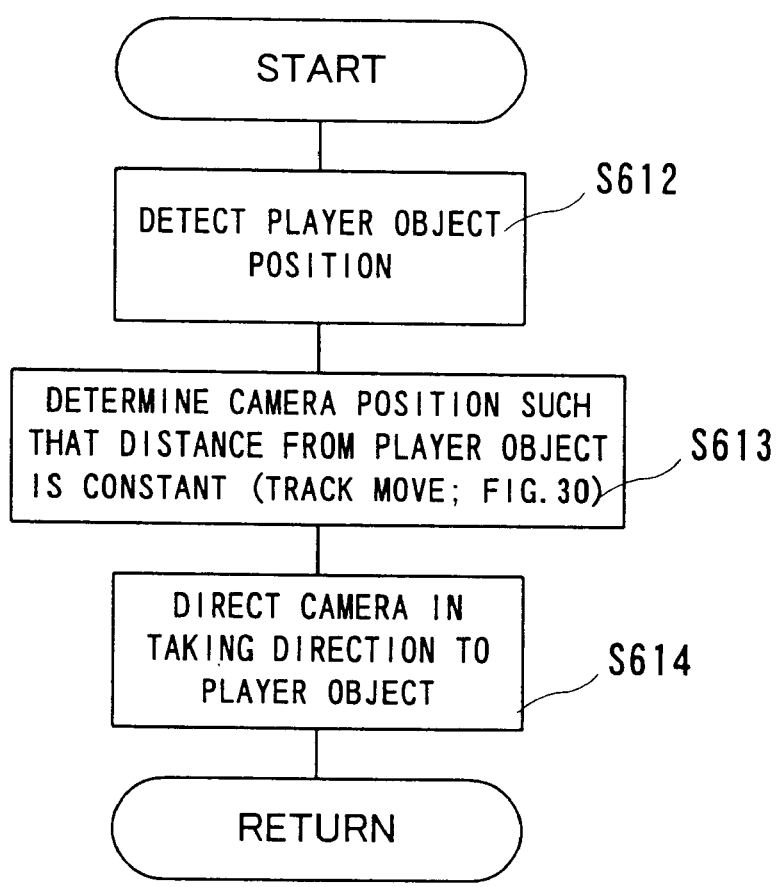
FIG. 12 is a flowchart showing in detail a first camera control program in the FIG. 10 flowchart.
Figure 13:
FIG. 13 is an illustrative view showing a player object taken by a first camera according to the FIG. 12 flowchart.
Figure 14:
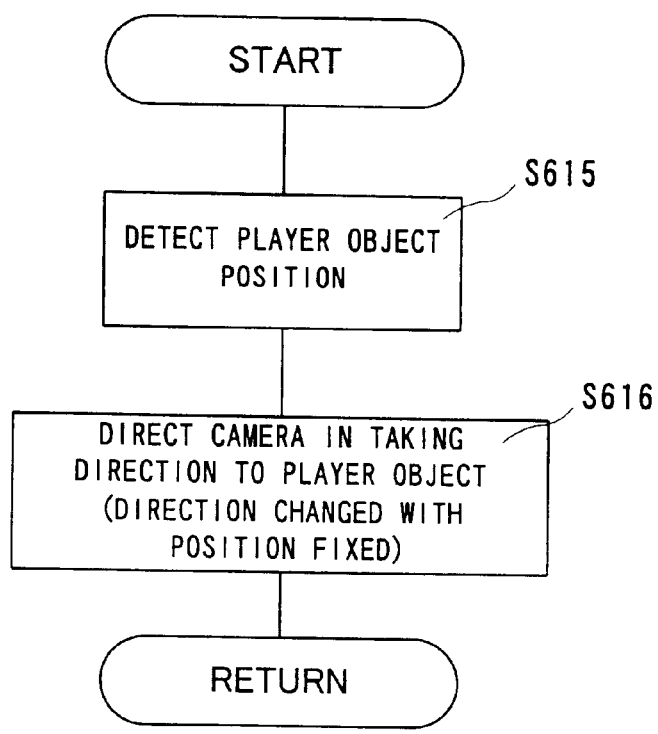
FIG. 14 is a flowchart showing in detail a second camera (fifth camera) control program in the FIG. 10 flowchart.

In a second camera control program to be executed in step S605 (FIG. 10), in the first step S615 a position of the player object is detected as shown in FIG. 14, similarly to the former step S612 (FIG. 12). Then, in step S616, the second camera is directed of picture taking direction to the player object. That is, the second camera is to take the player object from a fixed position shown in FIG. 11.

Incidentally, because the fifth camera is a fixed camera likewise the second camera, a fifth camera control program to be selected in step S611 is similar to the second camera control program of FIG. 14.

Figure 15:
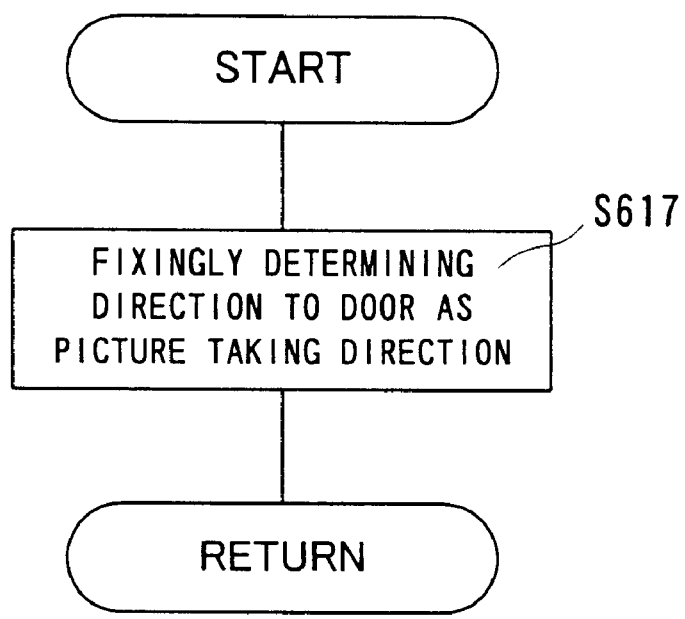
FIG. 15 is a flowchart showing in detail a third camera control program of the FIG. 10 flowchart.
Figure 16:
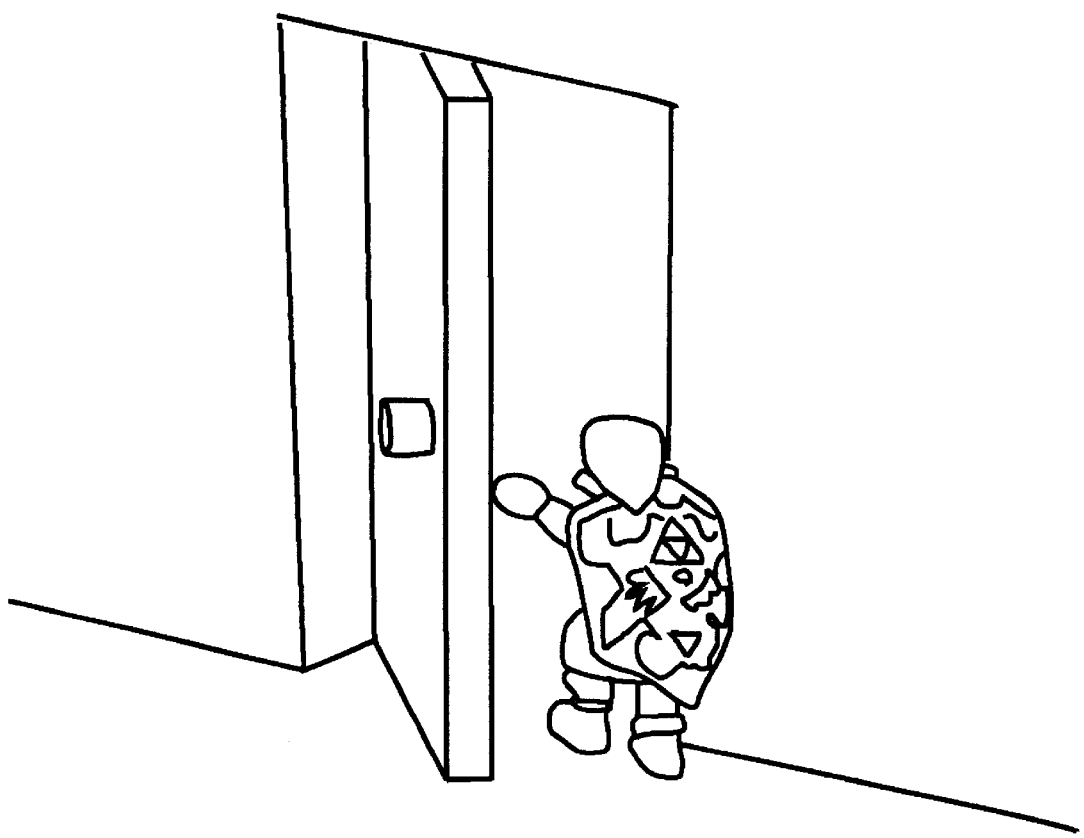
FIG. 16 is an illustrative view showing a player object taken by the third camera according to the FIG. 15 flowchart.

The third camera is fixedly set up in front of the door as was shown in FIG. 11. Accordingly, the third camera is to merely take the player object entering or exiting the door from a constant distance point. Due to this, the third camera control program of step S607 (FIG. 10) includes the step S617 of FIG. 15. In this step S617 the third camera is directed of picture taking direction to the door. Accordingly, the manner the player object is entering or exiting the door will be taken by the third camera, as shown in FIG. 16.

Figure 10:
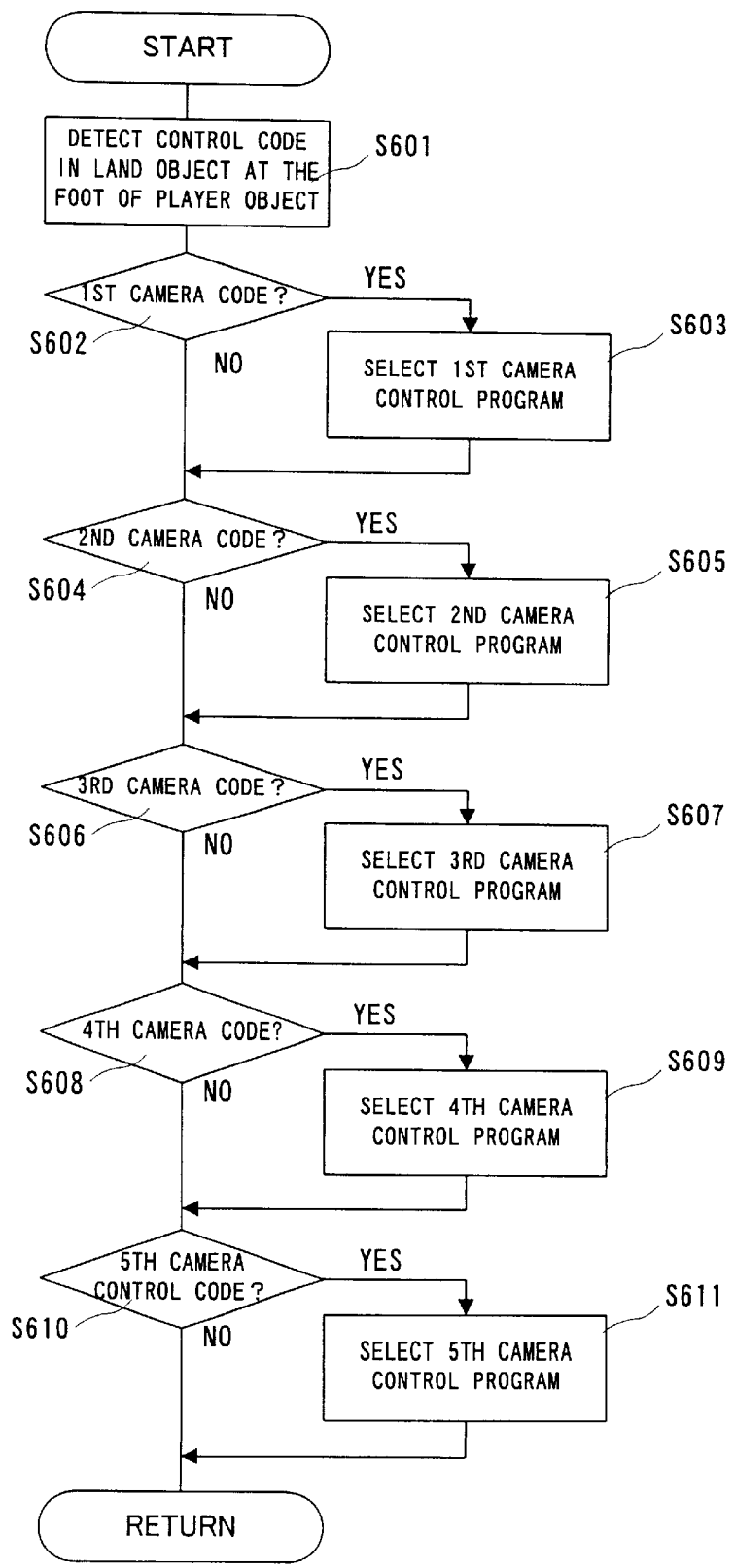
FIG. 10 is an illustrative view showing in detail a camera determining process in the FIG. 7 flowchart.
Figure 17:
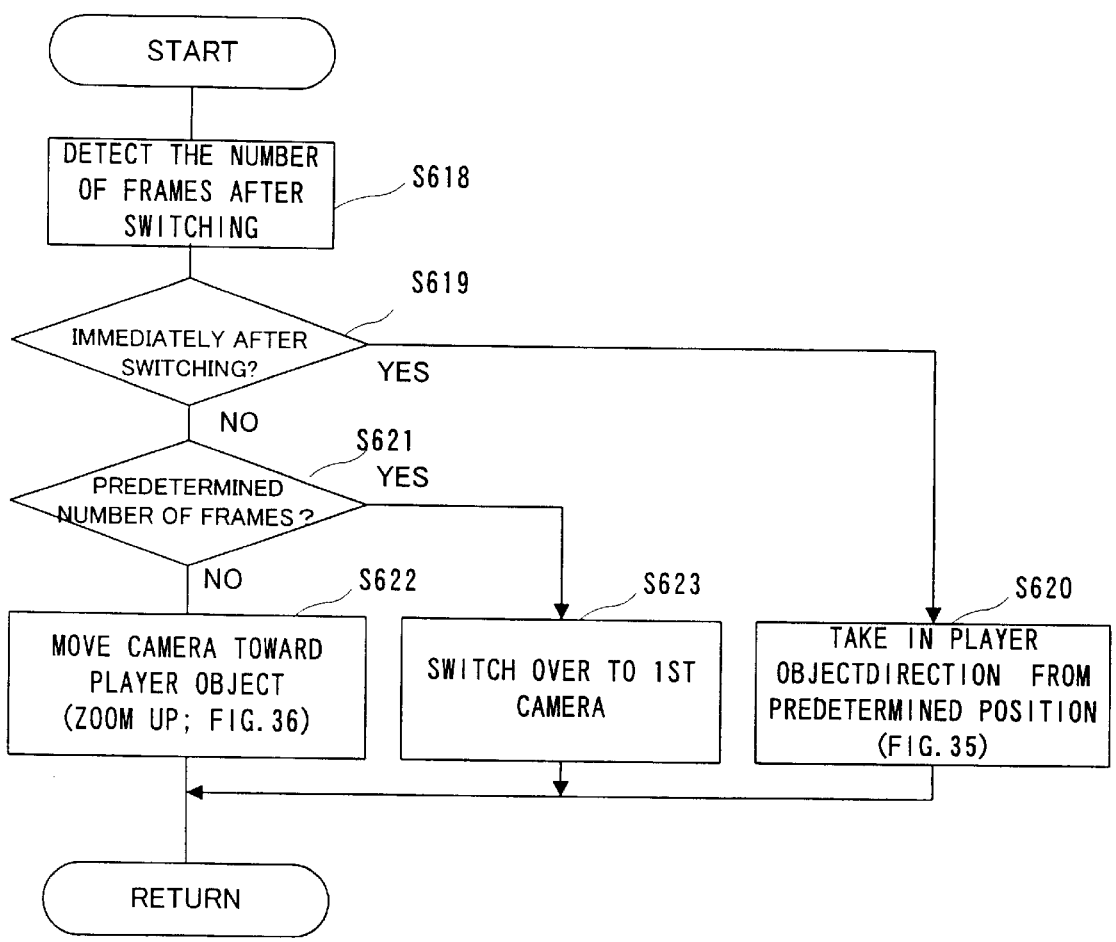
FIG. 17 is a flowchart showing in detail a fourth camera control program in the FIG. 10 flowchart.
Figure 18:
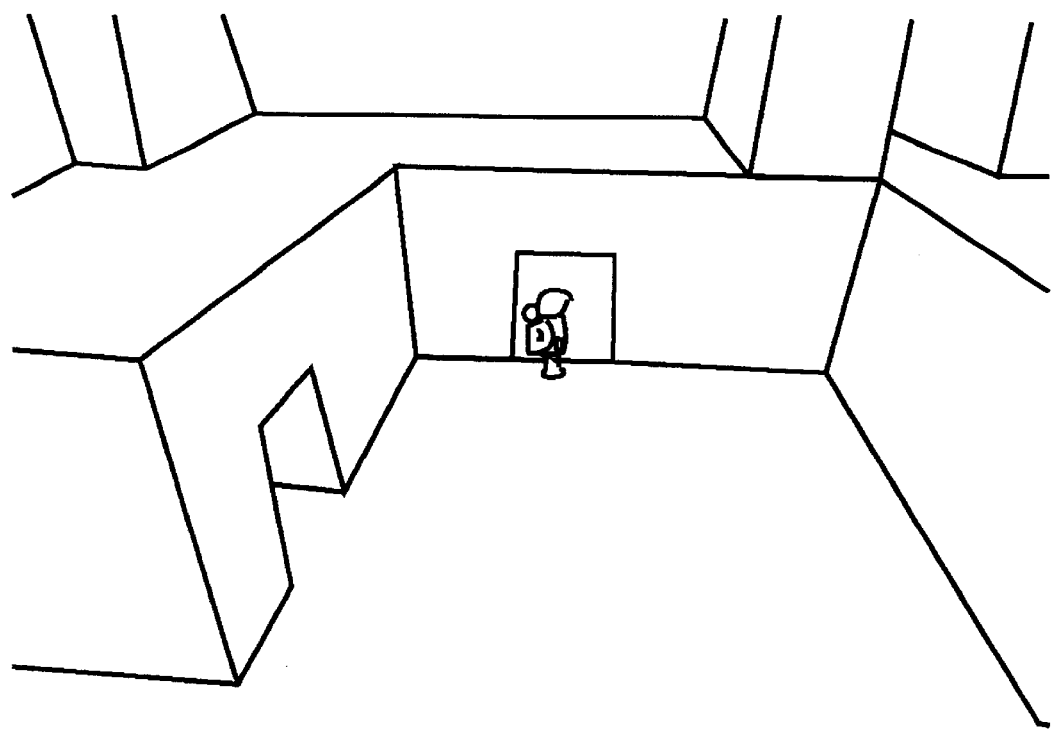
FIG. 18 is an illustrative view showing a player object taken by a fourth camera according to the FIG. 17 flowchart.

FIG. 17 shows a detail of a fourth camera control program to be executed in step S609 of FIG. 10. The fourth camera is chosen, as will be well understood from FIG. 11, when detected is a fourth camera code having been set on a block to which the player object has entered. In the first step S618 of FIG. 17, the number of frames is detected after detecting a fourth camera code and step S609 is entered, i.e. after camera change over. This is because there are two ways in which the fourth camera takes the player object. If the number of the frames is less than a predetermined number, i.e. when immediately after camera change over, "YES" is determined in step S619. In this case, the CPU 11 in step S620 controls the fourth camera such that the fourth camera takes, from a predetermined position, the player object entering the door. The player object taken by the fourth camera in the step S620 is illustrated in FIG. 18. As will be understood from FIG. 18, the fourth camera fixedly provided at the position shown in FIG. 11, in the step S620 wherein at immediately after camera change over, takes as a distant view the player object entering the door. That is, the fourth camera takes a comparatively wide range including the player object. Consequently, where the player object is entering the door as in this embodiment, from overall-view display the player can readily understand where the player object as a hero is now existing.

Figure 19:
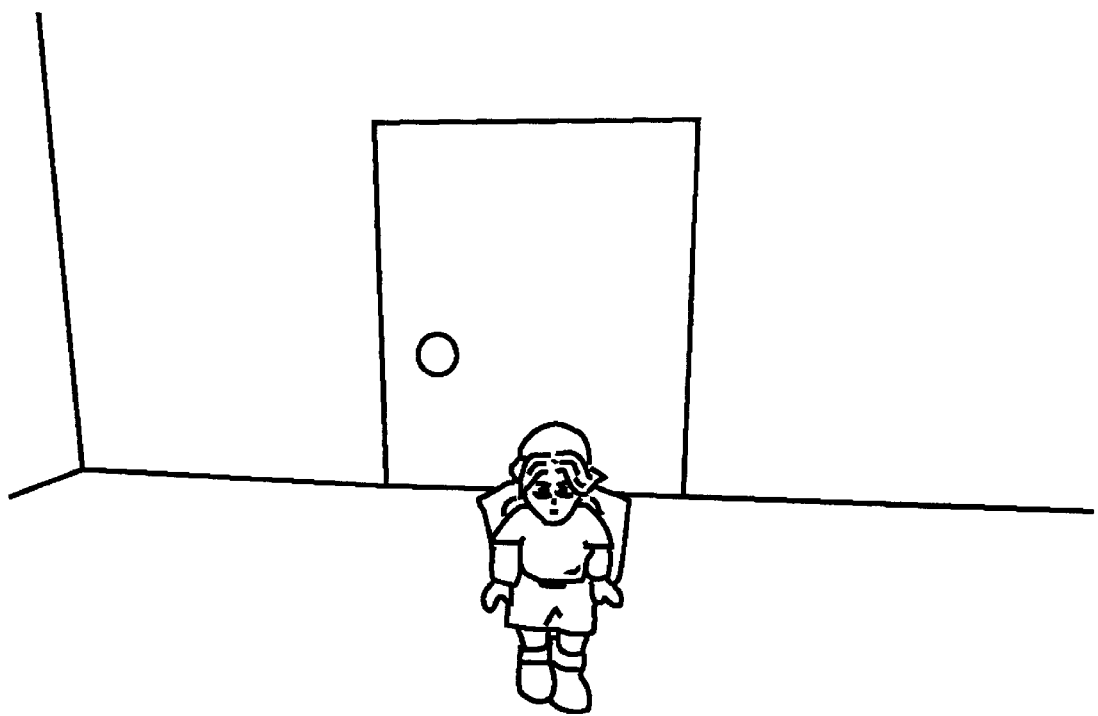
FIG. 19 is an illustrative view showing a player object taken by the fourth camera according to the FIG. 17 flowchart.

Before elapsing a predetermined number of frames or time from the camera change over but not immediately after that camera change over, "NO" is determined in step S621. In this case, in the following step S622 the CPU 11 causes the fourth camera to zoom up in order to take as a close-range view the player object, as shown in FIG. 19. That is, the picture taking is in a comparatively narrow range but including the player object.

If a predetermined number of frames has elapsed, "YES" is determined in the step S621. In this case, the CPU 11 switches from the fourth camera over to the first camera, as shown in step S623.

In this manner, according to this embodiment, it is possible to automatically switch over the camera to take the player object and its function depending upon a control code, or camera code, previously contained in a land object where the player object is existing. Consequently, even where troublesome camera switching is necessary, it is very easy for a program to set up therefor. Meanwhile, where the camera is switched depending upon a position of the player object (X-Y coordinate position), camera switching if same in X-Y coordinate is effected similar irrespective of a Z coordinate, or height. On the contrary, in the method of this embodiment the camera switching codes are embedded in the land objects. Accordingly, in the case of in a same X-Y plane but different in height (Z), it is possible to set a different land object, i.e. camera code, and hence a different camera. That is, in the embodiment, camera switching is feasible in a three dimensional fashion.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video game apparatus for generating, and supplying to a display, an image signal to display a player object existing on a land object in a virtual three dimensional space by processing image data for the player object and land object, said video game apparatus comprising:

a player object image data generator for generating player object image data to display a player object at various positions in three dimensional space;

a land object image data generator for generating land object image data to display a land object, wherein said land object image data includes a camera code;

a plurality of virtual cameras for depicting said player object existing in said virtual three dimensional space from a corresponding plurality of different perspectives;

a camera code detector for detecting a camera code included in said land object data of a land object having a predetermined relationship to the position of said player object;

a camera selector for selecting one of said plurality of virtual cameras in accordance with said camera code; and an image signal generator for generating an image signal depicting said player object by a virtual camera selected by said camera selector.

2. A video game apparatus according to claim 1, wherein at least one of said plurality of virtual camera is a movable camera which follows a movement of said player object, and said image signal generator including a movable camera controller to control said movable camera.

3. A video game apparatus according to claim 1, wherein at least one of said plurality of virtual cameras is a zoom camera, and said image signal generator including a zoom camera controller to control said zoom camera.

4. A video game apparatus according to claim 3, wherein said land object includes a partition wall to partition a part of said virtual three dimensional space, said player object being allowed to move passing through said partition wall from one to another side of said partition wall, said zoom camera being provided on said other side of said partition wall, and said zoom camera controller controlling said zoom camera such that said zoom camera depicts said player object in different manners after having moved to said other side.

5. A video game apparatus according to claim 4, wherein said zoom camera controller controls said zoom camera such that said zoom camera covers a comparatively wide range including said player object immediately after said player object has moved to said other side and thereafter covers a comparatively narrow range including said player object.

6. A storage medium to be applied to a video game apparatus for generating, and supplying to a display, an image signal to display a player object existing on a land object in a virtual three dimensional space by processing image data for the player object and land object, and stored with a program to be processed by an information processing system included in said video game apparatus, said memory medium comprising:

a player object image data generating program for generating player object image data to display a player object at various positions in three-dimensional space;

a land object image data generating program for generating land object image data to display a land object, wherein said land object image data includes a camera code;

a plurality of virtual cameras previously set up in order to depict said player object existing in said virtual three dimensional space from a corresponding plurality of different perspectives;

a camera code detecting program for detecting a camera code included in said land object data of a land object having a predetermined relationship to the position of said player object;

a camera selecting program for selecting one of said plurality of virtual cameras in accordance with said camera code; and an image signal generating program for generating an image signal depicting said player object by a virtual camera selected by said camera selecting program.

7. A storage medium according to claim 6, wherein at least one of said plurality of virtual cameras is a movable camera which can follow a movement of said player object, and said image signal generating program including a movable camera control program to control said movable camera.

8. A storage medium according to claim 6, wherein at least one of said plurality of virtual cameras is a zoom camera, and said image signal generating program including a zoom camera control program to control said zoom camera.

9. A storage medium according to claim 8, wherein said land object includes a partition wall to partition a part of said virtual three dimensional space, said player object being allowed to move passing through said partition wall from one to another side of said partition wall, said zoom camera being provided on said other side of said partition wall, and said zoom camera control program controlling said zoom camera such that said zoom camera depicts said player object in different manners after having moved to said other side.

10. A storage medium according to claim 9, wherein said zoom camera control program controls said zoom camera such that said zoom camera covers a comparatively wide range including said player object immediately after said player object has moved to said other side and thereafter covers a comparatively narrow range including said player object.

11. For use with a video game apparatus for generating, and supplying to a display, an image signal to display a player object existing in the vicinity of a land object in a virtual three dimensional space by processing image data for the player object and land object, and stored with a program to be processed by an information processing system included in said video game apparatus, a method for operating said video game system comprising the steps of:

generating player object image data for displaying a player object;

generating land object image data to display a land object;

associating a camera code with said land object image data;

providing a plurality of virtual cameras for depicting said player object existing in said virtual three dimensional space in a corresponding plurality of different perspectives;

detecting whether a land object having an associated camera code has a predetermined relationship to the position of said player object;

selecting one of said plurality of virtual cameras in accordance with said camera code; and generating an image signal depicting said player object by a selected virtual camera.

12. A method according to claim 11, wherein at least one of said plurality of virtual cameras is a movable camera which can follow a movement of said player object, and further including the step of controlling the movement of said movable camera.

13. A method according to claim 11, wherein at least one of said plurality of virtual cameras is a zoom camera, and further including the step of controlling the zooming of said zoom camera.

14. A method according to claim 11, wherein said land object includes a partition wall to partition a part of said virtual three dimensional space, and further including the step of allowing said player object to move through said partition wall from one to another side of said partition wall.

15. A method according to claim 14, wherein at least one of said plurality of virtual cameras is a zoom camera, and further including the step of disposing said zoom camera on said other side of said partition wall, and controlling said zoom camera to depict said player object in different zooming positions on said other side of said partition wall.

16. A method according to claim 15, wherein said step of controlling said zoom camera includes the step of controlling said zoom camera such that said zoom camera shoots over a comparatively wide range including said player object immediately after said player object has moved to said other side and thereafter shoots a comparatively narrow range including said player object.

* * * * *